United States Patent
Soffer

(10) Patent No.: US 11,354,426 B2
(45) Date of Patent: Jun. 7, 2022

(54) CELLULAR PHONE SECURITY PACK METHOD AND APPARATUS

(71) Applicant: High Sec Labs Ltd., Caesarea (IL)

(72) Inventor: Aviv Soffer, Geva Carmel (IL)

(73) Assignee: HIGH SEC LABS LTD., Caesarea (IL)

( * ) Notice: Subject to any disclaimer, the term of this patent is extended or adjusted under 35 U.S.C. 154(b) by 38 days.

(21) Appl. No.: 16/762,930

(22) PCT Filed: Nov. 14, 2018

(86) PCT No.: PCT/IL2018/051228
§ 371 (c)(1),
(2) Date: May 10, 2020

(87) PCT Pub. No.: WO2019/097511
PCT Pub. Date: May 23, 2019

(65) Prior Publication Data
US 2020/0364352 A1 Nov. 19, 2020

Related U.S. Application Data

(60) Provisional application No. 62/586,192, filed on Nov. 15, 2017.

(51) Int. Cl.
*G06F 21/60* (2013.01)
*H04L 29/06* (2006.01)
(Continued)

(52) U.S. Cl.
CPC ............ *G06F 21/602* (2013.01); *G06F 21/45* (2013.01); *H04B 1/3888* (2013.01);
(Continued)

(58) Field of Classification Search
CPC ..... G06F 21/602; G06F 21/45; H04B 1/3888; H04L 9/0897; H04L 9/3234; H04L 9/3231; H04W 12/02
(Continued)

(56) References Cited

U.S. PATENT DOCUMENTS 6,690,947 B1  2/2004  Tom
7,116,970 B2  10/2006  Brusilovsky et al.
(Continued)

FOREIGN PATENT DOCUMENTS

EP  2448216  5/2012
WO  2013011512 A1  1/2013
WO  2014188413 A1  11/2014

OTHER PUBLICATIONS

Search Report of PCT International Application No. PCT/IL2018/051228 dated Mar. 14, 2019.

*Primary Examiner* — Izunna Okeke
(74) *Attorney, Agent, or Firm* — Browdy and Neimark, PLLC

(57) ABSTRACT

A secure cellular communication system comprises a modified smartphone mated with a security pack. A Cryptographic module within the security pack encrypts all cellular outgoing data and decrypts cellular incoming data. The modified smartphone is modified to rout all cellular outgoing data and incoming data via the Cryptographic module within the security pack. The cellular MODEM may reside within the security pack while the phone's cellular MODEM is disabled, or the phone's cellular MODEM may be used.

17 Claims, 4 Drawing Sheets

(51) Int. Cl.
  *G06F 21/45* (2013.01)
  *H04B 1/3888* (2015.01)
  *H04L 9/08* (2006.01)
  *H04L 9/32* (2006.01)
  *H04W 12/02* (2009.01)
  *H04M 1/72409* (2021.01)

(52) U.S. Cl.
  CPC .......... *H04L 9/0897* (2013.01); *H04L 9/3234* (2013.01); *H04M 1/72409* (2021.01); *H04W 12/02* (2013.01)

(58) Field of Classification Search
  USPC ........................................ 713/164, 189, 191
  See application file for complete search history.

(56) References Cited

U.S. PATENT DOCUMENTS

| | | |
|---|---|---|
| 7,414,529 B2 | 8/2008 | Boss et al. |
| 7,603,139 B1 | 10/2009 | Tom |
| 7,657,286 B2 | 2/2010 | Kasslin et al. |
| 7,673,338 B1 | 3/2010 | Osborn, III et al. |
| 8,367,235 B2 | 2/2013 | Huang |
| 9,098,696 B2 | 4/2015 | Johnson et al. |
| 9,560,012 B1 | 1/2017 | Bonang et al. |
| 2002/0187808 A1 | 12/2002 | Vallstrom et al. |
| 2003/0068034 A1 | 4/2003 | Silvester |
| 2004/0203732 A1 | 10/2004 | Brusilovsky et al. |
| 2006/0122902 A1 | 6/2006 | Petrov et al. |
| 2006/0129848 A1 | 6/2006 | Paksoy et al. |
| 2007/0235519 A1 | 10/2007 | Jang et al. |
| 2009/0069051 A1 | 3/2009 | Jain et al. |
| 2009/0181716 A1 | 7/2009 | Benco et al. |
| 2014/0018125 A1 | 1/2014 | Shoshan et al. |
| 2014/0065948 A1 | 3/2014 | Huang |
| 2014/0082728 A1 | 3/2014 | Kim et al. |
| 2016/0043764 A1* | 2/2016 | Huang ................. H04M 1/185 455/575.8 |
| 2016/0173244 A1 | 6/2016 | Ding |
| 2017/0220788 A1 | 3/2017 | Nahamoni et al. |
| 2019/0095655 A1* | 3/2019 | Krawczewicz ....... H04W 12/06 |

* cited by examiner

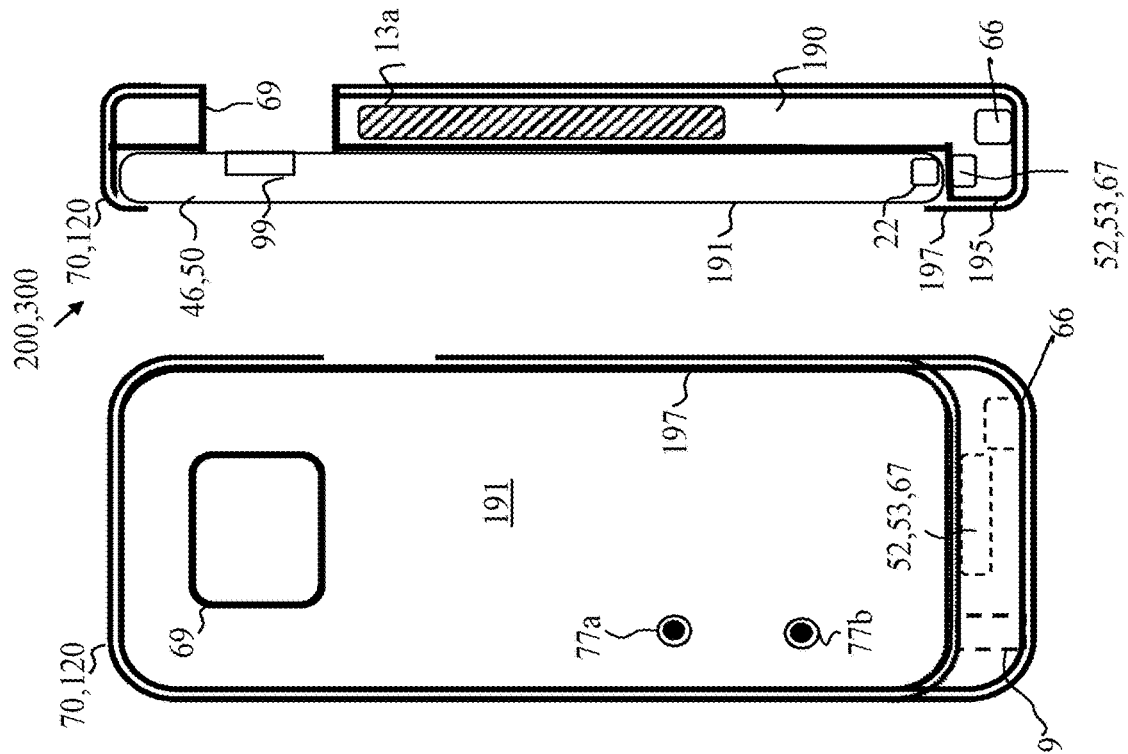

CELLULAR PHONE SECURITY PACK METHOD AND APPARATUS

CROSS-REFERENCE TO RELATED APPLICATIONS

This application is a National Phase Application of PCT International Application No. PCT/IL2018/051228, International Filing Date Nov. 14, 2018, entitled "Cellular Phone Security Pack Method and Apparatus", published on May 23, 2019 as International Patent Application Publication No. WO 2019/097511, claiming the benefit of U.S. Provisional Patent Application No. 62/586,192, filed Nov. 15, 2017, which is incorporated herein by reference in its entirety.

FIELD OF THE INVENTION

The present invention relates to a mobile phone system that provides high-security encrypted voice and data capabilities while using slightly modified mobile phones and mechanically attached security pack. More specifically the present invention relates to a standard smart-phone device that its cellular modem was removed or disable and a connected security pack having cellular modem as well as a cryptographic function to provide an alternative encrypted communication channel.

BACKGROUND OF THE INVENTION

Cellular phones are used by billions of people today. Some mobile phone users are working for organizations that have special security requirements. These security requirements cannot be easily met by current cellular phone security solutions. Mobile phones are an open platform that can be easily infected and even fully controlled by malicious code from remote sources.

Current mobile phone security includes software applications that run at the mobile phone. Typically security solutions that rely entirely on software are not considered secure enough for many organizations.

In some mobile phones these security applications are executed inside special partitions in the phone's CPU (Central Processing Unit) or SOC (System On a Chip) called "ARM TrustZone" or "Trusted Execution Environment" (TEE). This partition is a secure area of the main processor. It guarantees code and data loaded inside to be protected with respect to confidentiality and integrity. The TEE as an isolated execution environment provides security features such as isolated execution, integrity of Trusted Applications along with confidentiality of their assets. Although "ARM TrustZone" or TEE offers an execution space that provides a higher level of security, it is still vulnerable to multiple attack vectors on the phone.

Trust-Go; of 14F-3, No. 201, Sec. 2, Wenxin Rd., Situn Dist., Taichung City 40758, Taiwan, R.O.C; provides a range of security products for mobile devices such as: GO-Trust ID, GO-Trust FIDO Solution, GO-2Factor BLE Card, iReader, and GO-Trust Encrypter. The company claims that the Service Provider and Device Independent Federal ID Strength Security that has been available on Windows is available on iOS, and it is the First Portable, FIPS 140-2 Level 3 and FIPS 201 Security for iPhones and iPads.

Microsoft Corporation provides information about their services "Trusted Boot: Secure Boot—Measured Boot" in their websites.

BarcoSilex, of Scientific Park, 7 Rue du Bosquet, 1348 Louvain-La-Neuve, Belgium, commercially provides: Security Platform & Solutions such as eSecure, and CrytoSoC Accelerator, and Cryptography IP cores supporting AES, Public key, TRNG, Hash, etc.

VYSK; of 300 Convent St, Suite 1900, San Antonio, Tex. 78205, provides the Vysk QS1 case having external battery, which claims to turns the apple smartphones into a secure form of communication.

POMM inc, of 600 Columbus, New York, N.Y., 10024, had announced that it is developing a rechargeable battery protective case with local built-in massive secured depository, providing well organized storage of multiple types of files. It is compatible with all leading Android and iPhone Smartphones, soon to be Available.

Rechargeable External Batteries, a Portable Charger integrated in a Protective Charging Case, are available for a range of mobile phones and are commercially available, for example via Amazon.com. For example, US20110159324; titled "Battery pack, holster, and extendible processing and interface platform for mobile devices"; discloses a battery pack for a mobile communication device, comprising a casing defining a cavity that conforms, at least partially, to the outer shape of the mobile communication device and one or more rechargeable power cells housed within the thickness of the casing.

Some background information can be found in the following referenced patents and applications US20130179944; "Personal area network (PAN) ID-authenticating systems, apparatus, method"

US20160125388; "Off-line guiding and confirmation device and method for supporting mobile payment"

US20080292101; "Method and System for Improving Robustness of Secure Messaging in a Mobile Communications Network"

US20110302408; "Secure Communication Systems, Methods, and Devices"

SUMMARY OF THE INVENTION

In this discussion the term "red" indicates high sensitivity data and devices and functions for handling high sensitivity data, while the term "black" indicates low sensitivity data and devices and functions for handling low sensitivity data, Black (low sensitivity) data may be broadcasted wirelessly using standard cellular communication channel. Red (sensitive) data need to be kept within the red sections of the system, or be encrypted before exposed to the black section of the system.

According to an aspect of the present disclosed subject matter, a security pack for securing a smartphone is provided. In some exemplary embodiments the security pack has no wireless communication capabilities. In some exemplary embodiments the security pack has wireless communication capabilities.

According to another aspect of the present disclosed subject matter, a secure modified smartphone to be mated with a security pack is provided. In some exemplary embodiments the secure modified smartphone has wireless communication capabilities while the security pack has no wireless communication capabilities. In some exemplary embodiments the secure modified smartphone has no wireless communication capabilities while the security pack has wireless communication capabilities.

According to another aspect of the present disclosed subject matter, a secure mobile phone system comprising a modified smartphone mated with a security pack is provided. In some exemplary embodiments the secure modified smartphone has wireless communication capabilities while the security pack has no wireless communication capabilities. In some exemplary embodiments the secure modified smartphone has no wireless communication capabilities while the security pack has wireless communication capabilities.

According to another aspect of the present disclosed subject matter, a method of modifying a mobile phone to enhance its security when mated with a security pack is provided. In some exemplary embodiments the modification comprises disabling or removing wireless communication capabilities of the mobile phone.

According to another aspect of the present disclosed subject matter, a cellular phone security system is provided, the system comprising:
one or more modified cellular phones having at least one of its radio functions removed or disabled; and
a security pack,
wherein each one of the said modified cellular phone is having a mechanically and electronically coupled security pack,
wherein the security pack is substantially fit behind the cellular phone,
wherein the security pack comprises:
a. a phone interface to provide serial data communications between the modified cellular phone and the security pack;
b. a cryptographic module having red and black interfaces, the cryptographic module is capable of encrypting red data received through its red interface from the modified cellular phone via the phone interface and further capable of decrypting black data received from cellular modem through the black interface and after being decrypting it is transmitting the decrypted data to the modified cellular phone through the red interface and via the phone interface;
c. a cellular modem having at least one antenna, capable of wirelessly connecting to a cellular network and:
i. transmitting to the network black data received from said cryptographic module via the black interface, and
ii. receiving black data from network and transmitting it to the said cryptographic module via the black interface.

In some exemplary embodiments the cellular phone security system further comprises one or more servers or crypto devices coupled to the cellular network infrastructure and capable of encrypting red data coming from classified organization red network and converting it into encrypted black data stream sent over the cellular network to the one or more said security packs and vice versa.

In some exemplary embodiments the modified cellular phone is further modified to deliver higher than normal power to the coupled security pack.

In some exemplary embodiments the modified cellular phone is further coupled to the security pack black side power input via the phone interface through a power supply having high Power Supply Rejection Ratio (PSRR).

In some exemplary embodiments the security pack is having an additional battery to independently power one or more components security pack components.

In some exemplary embodiments the security pack is further comprising of an auxiliary data and power port to enable connection of charger or external computing device.

In some exemplary embodiments the security pack cryptographic module is further comprising a key-loader interface to enable connection to an external key-loader device.

In some exemplary embodiments the security pack cryptographic module further comprises at least one emergency erase buttons that purge secret data and programs stored in the module.

In some exemplary embodiments the security pack cryptographic module is further comprising at least one tamper detection sensors to enable erase of secret keys, data and programs in case that the physical security of the device was compromised.

In some exemplary embodiments the security pack further comprises radio devices selectable from the list of: GPS receiver, Wireless LAN, NFC reader and Bluetooth.

In some exemplary embodiments the security pack further comprises at least one biometric sensor to support user authentication.

In some exemplary embodiments the modified cellular phone is having a custom built high-security software image.

According to yet another aspect of the present disclosed subject matter, a cellular phone security system is provided, the system comprising:
one or more modified cellular phones having special software image,
wherein each one of the modified cellular phones is having a cellular transceiver, and
wherein each one of the modified cellular phones is having mechanically and electronically coupled security pack that substantially fit behind the cellular phone
wherein the security pack comprises:
a. a red phone interface to provide serial data communications between the said modified cellular phone and security pack;
b. a cryptographic module having red and black interfaces, capable of:
encrypting red data received through its red interface from the modified cellular phone via the phone interface to black data, and send the black data back to the phone via the black interface; and
decrypting black data received from the cellular modem through the black interface to red data, and after decrypting send the decrypted red data back to the modified cellular phone through the red data interface;
and wherein the phone cellular transceiver is in cellular communication with the nearby cellular base-station, exchanging black data only; and
one or more servers or crypto devices coupled to the cellular network infrastructure for encrypting red data coming from classified organization red network and converting it into encrypted black data stream sent over the cellular network to the one or more said modified cellular phones and vice versa.

According to an aspect of the present disclosed subject matter, a cellular phone security system is provided, the cellular phone security system comprising: a modified cellular Smartphone; and a security pack, the security pack comprises a Cryptographic module to encrypt all cellular outgoing data and decrypt all cellular incoming data, wherein the security pack is mechanically and electrically connected the modified cellular Smartphone, and wherein the modified cellular phone is modified to route all cellular outgoing data and all cellular incoming data via the Cryptographic module such that cellular data exchange between the modified cellular Smartphone and the cellular network is encrypted by the Cryptographic module.

In some exemplary embodiments the modified cellular Smartphone is modified to disable the native cellular transceiver within the modified cellular Smartphone; and the security pack further comprises an external cellular transceiver, wherein the Cryptographic module is connected between the modified cellular Smartphone and the external cellular transceiver.

In some exemplary embodiments, the modified cellular Smartphone is modified by installing modified high-security Operating System software image to improve security, wherein the high-security Operating System software image is configured to route all cellular outgoing data and all cellular incoming data via the Cryptographic module such that cellular data exchange between the modified cellular Smartphone and the cellular network is encrypted by the Cryptographic module.

In some exemplary embodiments the security pack is constructed in a form of a protective case having a cavity into which the modified cellular Smartphone is inserted such that the touch-screen of the modified cellular Smartphone is exposed.

In some exemplary embodiments the security pack further comprises a hole located in front of the back camera of the modified cellular Smartphone.

In some exemplary embodiments, the security pack further comprises: a rigid enclosure, the rigid enclosure enclosing at least the Cryptographic module; a tamper detector, for detecting physical tampering or attempt to open the rigid enclosure; and at least one buttery for powering the tamper detector when the security pack is not powered, wherein triggering the tamper detector cause irreversible disablement of the functionality of the security pack.

In some exemplary embodiments, the security pack further comprises two emergency erase switches, located within the cavity into which the modified cellular Smartphone is inserted and exposed only when the modified cellular Smartphone is not inserted in the cavity, wherein simultaneously pressing the two emergency erase switches for predefined time interval initiates an erase sequence causing erasure of cryptographic keys, thus disabling the functionality of the security pack.

In some exemplary embodiments, the security pack further comprises auxiliary device connector, the auxiliary device connector is for at least one of: a. loading software, data or cryptographic keys into the security pack; b. commanding or reprogramming the modified cellular Smartphone; c. charge a t least one battery within the security pack or within the modified cellular Smartphone; and d. connecting axillary computing unit for exchanging data with the modified cellular Smartphone.

In some exemplary embodiments, the security pack further comprises at least one additional wireless unit, the at least one additional wireless unit is selected from the group consisting of: a. wireless LAN such as Wi-Fi; b. Bluetooth; c. Near-Field Communication (NFC) reader; and d. GPS receiver.

In some exemplary embodiments, the Cryptographic module is having: a high-security side, connected to a high-security bus, for exchanging sensitive data only; and a low-security side, connected to a low-security bus, for exchanging only encrypted data, the encrypted data is one of: a. data to be decrypted by the Cryptographic module; or b. data encrypted by the Cryptographic module.

In some exemplary embodiments, the high-security bus is coupled to the modified cellular Smartphone; and the low-security bus is coupled to the external cellular transceiver.

In some exemplary embodiments, the security pack further comprises at least one additional wireless unit, and the low-security bus is coupled to the additional wireless unit.

In some exemplary embodiments, the cellular network is coupled to at least one server or crypto device for: encrypting high-security data coming from classified organization high-security network and converting it into low-security encrypted data stream sent over the cellular network to the one or more the modified cellular phones; and decrypting low-security encrypted data stream sent over the cellular network from the one or more the modified cellular phones converting it into high-security data sent to the classified organization high-security network.

According to another aspect of the present disclosed subject matter a security pack for securing a modified cellular Smartphone is provided, the security pack comprising: a Cryptographic module to encrypt all cellular outgoing data and decrypt all cellular incoming data, wherein the security pack is configured to be mechanically and electrically connected the modified cellular Smartphone, and wherein the security pack routes all cellular outgoing data and all cellular incoming data via the cryptographic module such that cellular data exchange between the modified cellular Smartphone and the cellular network is encrypted by the Cryptographic module.

In some exemplary embodiments, the security pack further comprises an external cellular transceiver, wherein the Cryptographic module is connected between the modified cellular Smartphone and the external cellular transceiver.

According to yet another aspect of the present disclosed subject matter, a method for securing a cellular phone is provided, the method comprising: a modifying a cellular Smartphone; coupling to the cellular Smartphone a security pack, wherein the security pack comprises a Cryptographic module to encrypt all cellular outgoing data and decrypt all cellular incoming data, wherein the security pack is mechanically and electrically connected the modified cellular Smartphone, and wherein the modified cellular phone is modified to route all cellular outgoing data and all cellular incoming data via the Cryptographic module such that cellular data exchange between the modified cellular Smartphone and the cellular network is encrypted by the cryptographic module.

In some exemplary embodiments, the modifying the cellular Smartphone comprises disabling the native cellular transceiver within the modified cellular Smartphone; and the security pack further comprises an external cellular transceiver, wherein the Cryptographic module is connected between the modified cellular Smartphone and the external cellular transceiver.

In some exemplary embodiments, the modifying of the cellular Smartphone comprises installing modified high-security Operating System software image to improve security, wherein the high-security Operating System software image is configured to route all cellular outgoing data and all cellular incoming data via the Cryptographic module such that cellular data exchange between the modified cellular Smartphone and the cellular network is encrypted by the Cryptographic module.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments of the present invention only, and are presented in the cause of providing what is believed to be the most useful and readily understood description of the principles and conceptual aspects of embodiments of the invention. In this regard, no attempt is made to show structural details in more detail than is necessary for a fundamental understanding of the embodiments; the description taken with the drawings making apparent to those skilled in the art how the several forms of the invention may be embodied in practice. In the accompanying drawings:

FIGS. 4A-4C schematically illustrate an exemplary embodiment of a secure mobile phone with the security pack attached.

DETAILED DESCRIPTION OF THE DRAWINGS

Figure 1:
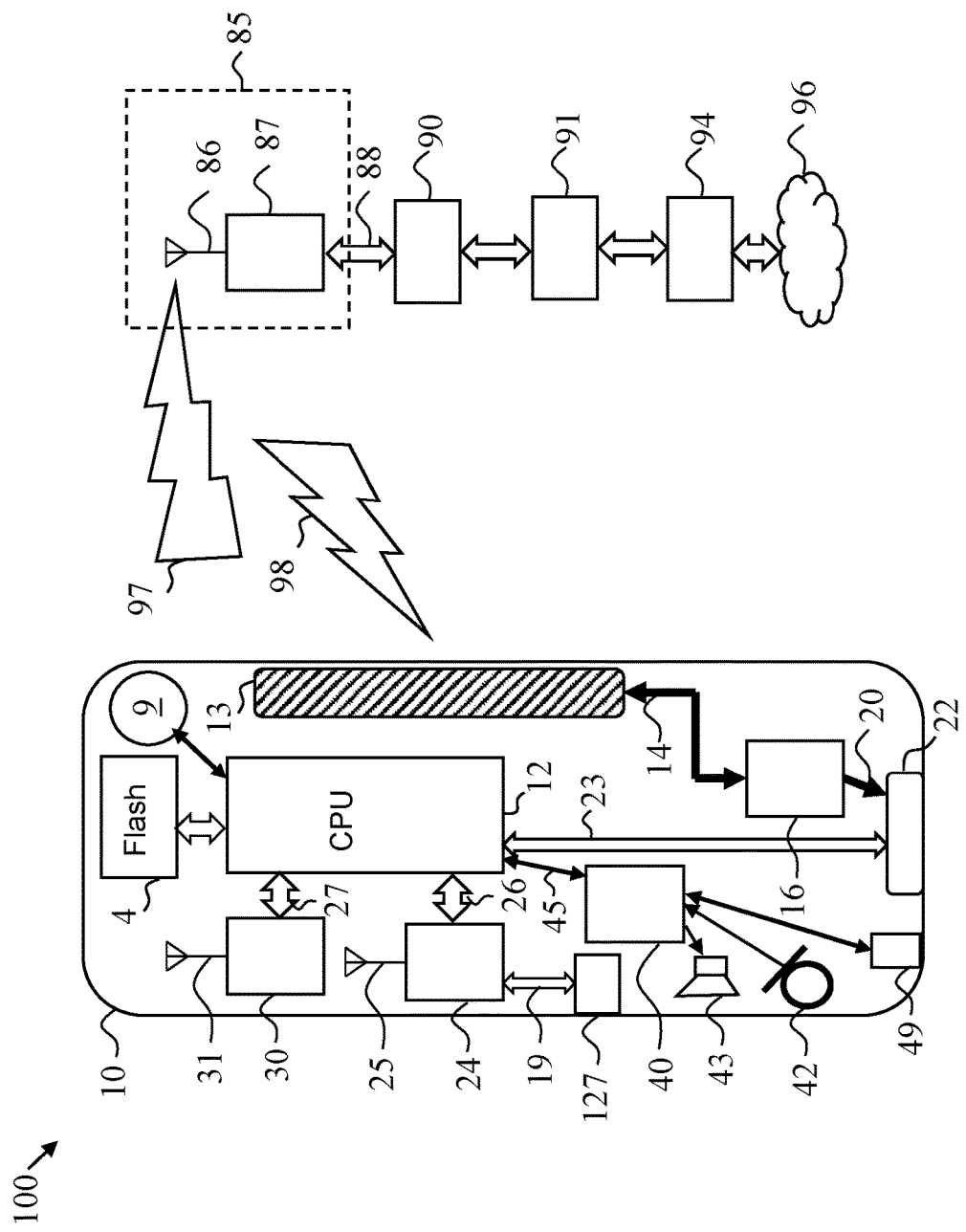
FIG. 1 schematically illustrates a mobile phone system according to the prior-art.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand-alone programs, may be incorporated as subroutines in an operating system, may be functions in an installed software package, and the like.

Some phones may have an additional removable flash (not seen in these figures)(for storing additional data. In some exemplary embodiments, the removable flash is removed, and/or its socket is disabled or removed. Alternatively, data encryption may be used to encrypt all or sensitive data on the removable flash FIG. 1 schematically illustrates a mobile phone system 100 according to the prior-art. In this figure some of the common mobile phone 10 components were omitted to avoid cluttering. Mobile phone 10 non-volatile memory such as flash component 4 stored the phone software image that includes the operating system, software applications and various system and user data. Flash memory 4 is coupled to CPU (Central Processing Unit) 12. CPU 12 may be ARM architecture or any other single or multi-core microprocessor or SOC (System On a Chip). CPU 12 is coupled through interface bus 26 to the cellular MODEM (Modulator Demodulator) 24 that contains among other components the baseband and the radio transceiver that are required to access the cellular wireless network through one or more antennas 25. More than one antenna may be required to improve the quality and reliability of a wireless link (this function called antenna diversity or space diversity. Cellular MODEM 24 is coupled through lines 19 to SIM (Subscriber identity module) card socket 127 to support user inserted SIM card. CPU 12 is further coupled through interface bus 27 to additional wireless receivers or transceivers 30 that is in turn coupled to one or more matching antennas 31. Additional wireless receivers or transceivers may be wireless LAN (Local Area Network sometimes called Wi-Fi). Bluetooth, GNSS (Global Navigation Satellite System), GPS (Global Positioning System), NFC (Near-field communication) or any other standard wireless protocol supported circuitry.

CPU 12 is further coupled through serial interface 45 to audio CODEC or AFE (Analog Front End) 40 that is coupled to one or more microphones 42 and one or more speakers 43. Audio CODEC or AFE (Analog Front End) 40 may be further coupled to headphones jack 49 to enable connection of external wired headphones or headset.

CPU 12 is further coupled through a serial docking interface 23 to the docking connector 22 usually located at the bottom of the phone 10.

Power to the phone 10 is supplied from rechargeable battery 13 that is coupled through power lines 14 to the charger/power conditioner circuitry 16 that is in turn coupled to the docking connector 22 via power line 20. Docking connector 22 enables phone 10 operation from external charger and/or battery 13 charging. If docking connector 22 is configured to support USB (Universal Serial Bus) OTG (On The Go) protocol such as USB 3.1 then, the charger/power conditioner function 16 may be used to detect the type of connected USB device to allow the phone 10 to act as a USB device that receives power from the external entity. Alternatively it may allow the phone 10 to act as a USB host that supplies power to an external entity that may be connected to docking connector 22.

Phone 10 cellular MODEM 24 transmits through antenna 25 packetized data 98 to a nearby cellular base-station 85 having one or more antennas 86 and radio transceiver 87. Similarly base station 85 transceivers 87 transmits packetized data 97 to phone 10 antenna 25 through base-station antenna 86. Data received from phone 10 is passed from base-station 85 over the Cellular carrier network backhaul 88 to the Mobile carrier core network servers 90. Similarly data intended to the mobile phone 10 is passed from the Mobile carrier core network servers 90 via the Cellular carrier network backhaul 88 to the assigned base-station 85 to enable transmission 97 to the mobile phone 10. Such data may include packetized voice or application data such as web-browser data. Internet 96 data is passing through the Carrier packet gateway (PGW) 94, the Mobile carrier Serving Gateway (SGW) 91 and then to the Mobile carrier core network servers 90. Voice calls are diverted and routed through routers to different mobile carriers (not shown here) or to different callers on the same carrier network through the same Cellular carrier network backhaul 88.

Malicious code may infect phone 10 through the connection to the internet 96 or through wireless LAN or other wireless interface 30. Malicious code may run on the mobile phone 10 CPU 12 and may be temporarily stored in RAM (Random Access Memory) or cache (not shown here) or permanently stored on flash 4. CPU 12 may run various intrusion detection or anti-virus applications. Still as CPU 12 lacks root-trust, it is possible that the malicious code will survive such applications and infect the mobile phone 10. Furthermore, various man-in-the-middle attacks on mobile phone 10 are possible as voice and data transmitted 98 or received 97 by the mobile phone 10 are not strongly encrypted or not encrypted at all. Attacker may send data to the mobile phone 10 or intercept the transmitted data 97 and 98. As modern mobile phone are having multiple additional sensors (cameras, inertial sensors (not seen here) and GPS), it is possible that the remote attacker will operate these sensors to extract location, surrounding audio, video and other information that sensed by the mobile phone 10 sensors. As mobile phone 10 are having larger local storage space on flash 4, remote attacker may want to access such data remotely to gain access to the user emails, credentials, documents, encryption keys etc.

Mobile phone 10 may be equipped with at least one back camera 9.

Additionally, mobile phone 10 is equipped with at least one activation switch (located on the front or side wall) and optionally other controls such as audio volume "+" and "−", (usually located on the side wall). These controls are not seen in these figures.

Figure 2:
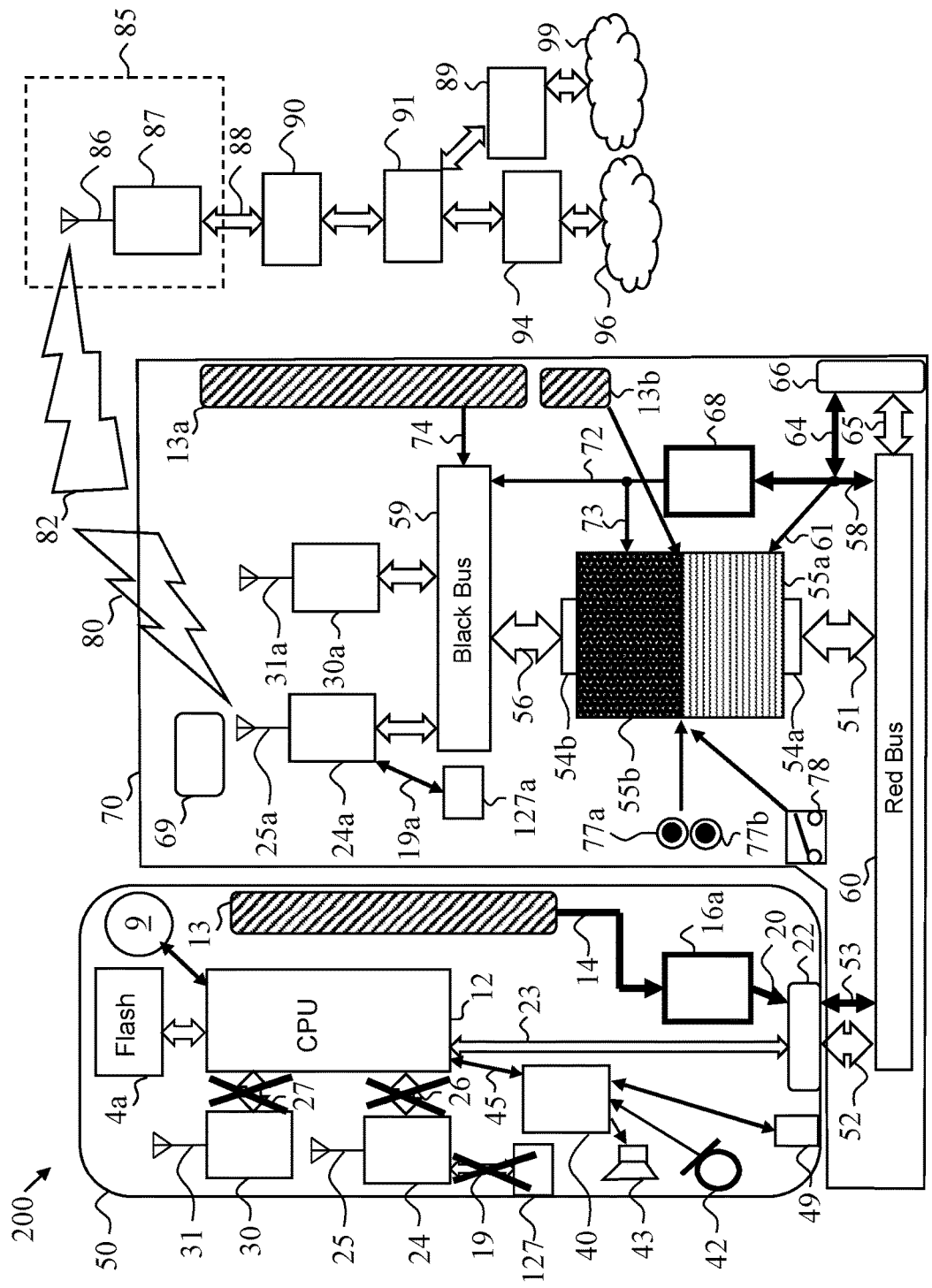
FIG. 2 schematically illustrates an exemplary embodiment of a secure mobile phone system with a modified mobile phone having a security pack with a cellular MODEM.

FIG. 2 schematically illustrates an exemplary embodiment of a secure mobile phone system 200 using a modified mobile phone having a security pack with a cellular MODEM.

In this figure, modified mobile phone 50 is modified version of the of-the-shelf mobile phone 10 of FIG. 1 above having its cellular communication capabilities disabled. Cellular communication is enabled via the security pack with a cellular MODEM 70.

The modifications implemented in this modified mobile phone 50 compared to mobile phone 10 of FIG. 1 may be one or more of the following:

1. Cellular MODEM 24 was disabled for example by disabling its interface 26 to the CPU or by disabling or completely removing that function or critical components in that function. To disable this function without removing it completely it is possible to cut some traces that provide power, clock or data to the Cellular MODEM 24 (as marked in the drawing).
2. Original carrier SIM may be removed or disabled.
3. Local flash slot (not marked in these figures) may be blocked, removed or disabled.
4. Other wireless functions 30 were disabled for example by disabling its CPU 4 interface 27 or by disabling or completely removing that function or critical components in that function;
5. Flash 4a was loaded with modified software image to accept the removed or disabled functions and to remove unnecessary and/or unsecure applications, functions and settings;
6. Docking charger/power conditioner circuitry 16a was optionally modified to enable higher current output from battery 13, through power lines 14, through the modified charger/power conditioner circuitry 16a, via power lines 20 to the docking connector 22. Alternatively boost function in charger/power conditioner circuitry 16a is bypassed or modified to prevent battery voltage up-conversion to 5V. Instead docking connector provides battery power voltage to prevent conversion losses at high currents. This modification may be done to avoid the need for battery 13a in the security pack 70. It is may be preferred that the security pack will operate without that additional battery.
7. Additional changes may be implemented as needed, for example removal, blocking or disabling of one or more video cameras such as the front camera (not seen in these figures), or back camera 9.

In this and in the following figures red data designates plain text, which is un-encrypted classified data, while black data designates encrypted data.

In this exemplary embodiment of the current invention the modified mobile phone 50 is having a mechanically and electrically attached security pack (or jacket) with MODEM 70 that temporarily or permanently secured to the back of the mobile phone 50. This security pack with MODEM 70 provides additional security functions to the modified mobile phone 50.

Modified cellular phone 50 docking connector 22 is coupled to the security pack with MODEM 70 by mating data connector 52 and power connector 53. These two functions may be mechanically integrated into a single plug connectors, for example USB 3.1 or Apple Lightening male connector. Data connector 52 couples the security pack with MODEM 70 red bus 60 to the modified mobile phone 50. Red bus 60 may be USB protocol or any other serial communication protocol that may interface with the modified mobile phone 50 docking connector 22. Red bus 60 may be powered through power connector 53 by the modified mobile phone 50 or alternatively when security pack with MODEM 70 is powered (externally or by its optional battery 13a), it may power the connected modified mobile phone 50 to support its operation and charging functions. Power to the security pack with MODEM 70 red bus 60 may be supplied through power lines 64 and 58 via auxiliary device connector 66 that may be USB OTG or any other standard or non-standard protocol that combines power and serial data. Auxiliary device connector 66 may have data connection 65 that enables connection of compatible external devices such as another phone, computer, wall charger etc. For example, external device connected to auxiliary device connector 66 may be an additional red laptop, tablet, phone, or proprietary device that will operate in parallel on the same pack. Such optional device may be used to load software, data or keys. It should be noted that the auxiliary device connector 66 is by definition red interface and therefore is used with secure devices running red (high security, unencrypted) applications. Such connection may allow the security pack with MODEM 70 to provide security and communications services to the additionally connected red device (not shown here).

Optionally the functions of auxiliary device connector 66 may be split to several connectors and other functions may be added. For example, some functions and optional functions such as: a) providing power for charging the batteries 13, 13*a*, 13*b*; b) exchanging red data; c) exchanging black data; d) commanding or reprogramming phone 46, 50; and e) commanding or reprogramming pack 70. The separate connectors (not seen in these figures) may use same or different connector type and use same or different communication protocols.

Security pack with MODEM 70 red bus 60 is further coupled through the Cryptographic module red side red bus data interface 51 and Cryptographic module red side data interface 54*a* to the Cryptographic module red side 55*a*. Cryptographic module red side 55*a* encrypt the data received from the modified mobile phone 50 to result black encrypted data stream at the Cryptographic module black side 55*b*. Similarly encrypted (black) data received from the security pack 70 black bus 59, is coupled through the Cryptographic module black bus data interface 56, the Cryptographic module black side data interface 54*b* and the Cryptographic module black side 55*b*, to generate an unencrypted (red) data to the connected modified mobile phone 50, through the Cryptographic module red side 55*a*, the Cryptographic module red side red bus data interface 51, the red bus 60, the data interface 52 and the modified cellular phone 50 docking connector 22.

To indicate similar or identical elements in this publication, the letter "x" following a numeral may stand for any letter such as "a", "b", etc. Cryptographic module 55*x* may use industry standard encryption algorithms having symmetric keys such as AES (Rijndael)-128 or 256 or Asymmetric key encryption such as ECC (Elliptic curve cryptography) or any other cryptographic function.

Cryptographic module 55*x* is further coupled to emergency erase switches 77*a* and 77*b* that enables the user to erase the secret keys and/or other classified data that is stored in the Cryptographic module 55*x*. To prevent false erase of the keys and classified data, the two erase switches 77*a* and 77*b* must be pressed simultaneously for predefined time interval before the erase sequence is triggered. Erase switches 77*a* and 77*b* may be used when the site was compromised, evacuated, or discarded, etc. Erase switches 77*a* and 77*b* may be physically protested by a protection cover, or may be located in a location that can be excessed only by separating the security pack from the phone.

Cryptographic module 55*x* is further coupled to anti-tampering switch or sensor 78 to enable detection of an attempt to tamper with the Cryptographic module 55*x* or to extract its secret keys. Upon detection of a tampering attempt by anti-tampering switch or sensor 78, the Cryptographic module 55*x* is entering secret keys erase cycle and record the event in the system log in non-volatile memory (not shown in this figure). It should be noted that small battery or super-capacitor 13*b* may be needed to enable keys erase and anti-tampering functions to operate when the security pack 70 is unpowered. While the user may be trusted, it is an object of exemplary embodiments of the invention to prevent secret keys from falling into the wrong hands and being used to "listen" to messages or applications. The applications themselves including the crypto code are optionally and typically not classified.

Cryptographic module 55*x* red side 54*a* is powered by the red bus 60 through power lines 61 and power lines 58. Cryptographic module black side 55*b* is powered by the red bus 60 through power lines 58, the Red to black power supply/filter 68 and power lines 73. The Red to black power supply/filter 6 is DC to DC power supply or LDO (Low Drop Out) regulator that have high PSRR (Power Supply Rejection Ratio) to reject noise induced by red data on the black output rail. Additional filtration may be needed in the Red to black power supply/filter 68 to power the black bus 59 and in particular the Cellular MODEM 24*a* and wireless functions 30*a* to prevent or reduce red data leakages over transmitted data 80 being transmitted by the security pack cellular modem 24*a* on the cellular network.

Black bus 59 is further coupled to cellular MODEM 24*a* that in turn coupled through SIM interface 19*a* to SIM card 127*a*. Sim card in modified phone 50 may be removed from (now optionally disabled) socket 127 as its purpose to support the local MODEM 24. Once the local MODEM 24 is deactivated, no local SIM is needed. It may be needed to modify the OS used by the modified mobile phone 50 to boot and operate without requiring the presence of a SIM card. Cellular MODEM 24*a* is further coupled to one or more antennas 25*a* to transmit data 80 and to receive data 82 over the air.

Black bus 59 is further coupled to additional wireless functions such as GPS, Wireless LAN or Wi-Fi., Bluetooth, NFC etc. that in turn coupled to one or more antennas 31*a*.

It should be noted here that additional wireless functions 30*a* and antennas 31*a* may be coupled to the red bus 60 instead of the black bus 59 if such data considered red. An example for such optional configuration would be red Near-Field Communication (NFC) reader that may be used to enable secret key loading.

Security pack optional rechargeable battery 13*a* may be similar to the mobile phone battery 13. This battery coupled to the black bus through power lines 74, may be needed to augment the mobile phone battery 13 and therefore to extend battery time. The option to install optional battery 13*a* depends on the operating time needed and the phone power output capabilities.

Security pack 70 cellular MODEM 24*a* transmits through antenna 25*a* packetized data 80 to a nearby cellular base-station 85 having one or more antennas 86 and radio transceiver 87. Similarly base station 85 transceivers 87 transmits packetized data 82 to the security pack antenna 25*a* through base-station antenna 86. Data received from the security pack 70 cellular MODEM 24*a* is passed from base-station 85 over the Cellular carrier network backhaul 88 to the Mobile carrier core network servers 90. Similarly data intended to the security pack 70 is passed from the Mobile carrier core network servers 90 via the Cellular carrier network backhaul 88 to the assigned base-station 85 to enable transmission 82 to the security pack 70. Such data may include packetized voice or application data.

Unlike the system 100 shown in FIG. 1 above, in this system 200, the mobile carrier divert the data to and from security pack 70 to a private cloud 99 instead of the internet cloud 96. This diversion may be done by Mobile carrier Serving Gateway (SGW) 91 as shown in this figure or by the carrier core network servers 90. Data is passed through Cryptographic module, appliance or server 89 having matching keys to those used by the security pack 70 cryptographic module 55*x*. Private cloud 99 may be LAN, WAN (Wide Area Network) or any other red network that is coupled to the organization red network. This arrangement prevents internet 96 data from reaching security pack 70. It also makes man-in-the-middle attacks or data reception much harder as the data is encrypted by an external cryptographic device that is less vulnerable compared to the mobile phone 10 of FIG. 1 above. Modified mobile phone 50 image may include one or more Voice Over IP (Internet Protocol) or CEDECs that enable secure calls between security packs 70x or from the organization cloud 99 phones or computers to modified mobile phones 50x.

Preferably, each security pack 70 is using different cryptographic key or keys such that compromising one security pack 70 does not compromise the security of other modified phones.

Figure 3:
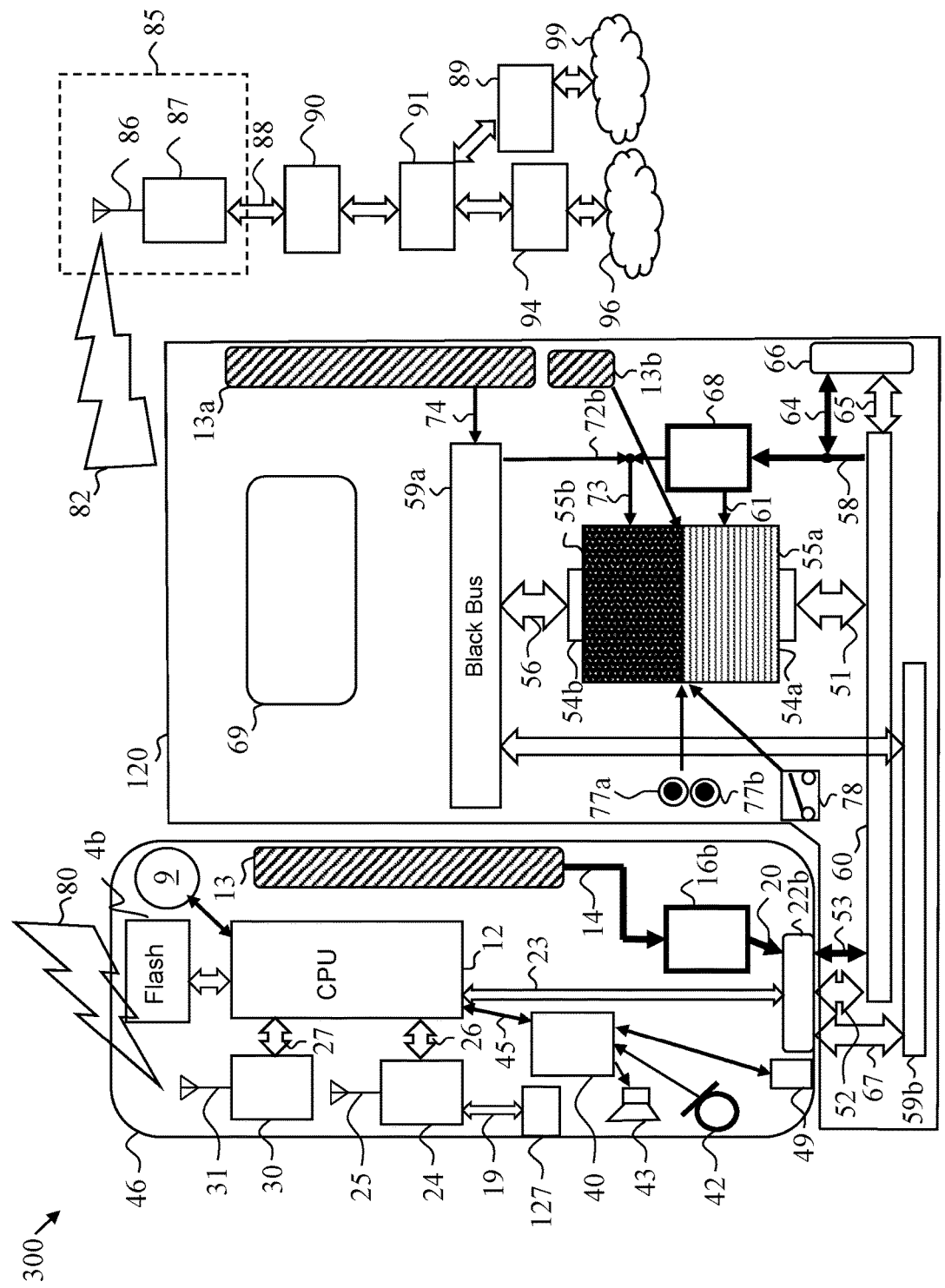
FIG. 3 schematically illustrates an exemplary embodiment of a secure mobile phone system with a mobile phone having a security pack that does not contain a cellular MODEM.

FIG. 3 schematically illustrates another exemplary embodiment of a secure mobile phone system 300 having a modified mobile phone with a cellular MODEM 46 and a security pack without a cellular MODEM 120.

Security pack without a cellular MODEM 120 is similar to security pack 70 of FIG. 2 above. Security pack without MODEM 120 does not contain a cellular MODEM (24a of FIG. 2). Instead, the security pack without MODEM 120 black bus 59a is routed back through bus 59b and black docking data interface 67 to the modified phone 46 docking connector 22b. Docking connector 22b is having a secure tunnel passed through data interface 23 and coupled to CPU 12. Black data is therefore routed back to CPU 12 and then through interface 26 to the cellular MODEM 24 and one or more antennas 25.

This exemplary embodiment of the current invention is considered as less secure as red and black data are using same physical interfaces. Nevertheless such implementation reduces the cost and the complexity of the security pack 120 by eliminating RF (Radio Frequency) transceivers (24a and 30a of FIG. 2) and antennas (25a and 31a of FIG. 2).

In this figure, security pack without MODEM 120 (as well as security pack with MODEM 70) may further having an aperture 69 to expose the mobile phone rear built-in functions such camera 9 and biometric reader (not shown in this figure).

FIG. 4 schematically illustrates exemplary embodiment of a secure mobile phone system 200 or 300, showing the physical attachment of security pack 70 or 120 to the corresponding modified phone 46 or 50.

Front view of modified phone 46 or 50 is seen in FIG. 4A, showing the touchscreen face 160, phone activation button 170 (optionally located on side wall), and optional audio volume controls 170a, Dashed lines shows the locations of back camera 9, headphones jack 49 and docking connector 22 (22b).

Front view of security pack 70 or 120 is seen in FIG. 4B, showing the flexible lip 197 for holding modified phone 46 or 50 in place and hole 69 for back camera 9, headphones jack 49 and docking connector 22 (22b). Erase switches 77a and 77b are located inside the cavity 191 which is sized to fit modified phone 46 or 50 in place, and are thus accessible only when the modified phone is removed from the security pack. Dashed line shows the location of: the open channel 149 allowing inserting earphone or headset plug into audio jack 49, mating data connector 52, 67 and power connector 53, and auxiliary device connector 66.

FIG. 4C schematically illustrates exemplary embodiment of a cross sectional view of a secure mobile phone system 200 or 300, showing modified phone 46 or 50 inserted into a corresponding security pack 70 or 120. Preferably rigid shell 195 forms the cavity 190 within which reside the electronic components of security pack 70 or 120 (only optional battery 13a is seen in this cross sectional view). Cavity 190 is protected by antitampering switch or sensor 78 (not seen in this figure).

Flexible lip 197 holds modified phone 46 or 50 in place while exposing touchscreen 191.

In order to enhance security, loading and updating software or application is not done from the internet. Such applications or updates may be sent encrypted by the organization or loaded as one big image that contains all needed applications. Loading may be done through the USB interfaces.

User applications are executed in a modified phone 50 or 46 as normally done in phone 10 on CPU 13, however, the OS installed in flash 4a or 4b is hardened to improve security. Optionally, unauthorized applications are prevented from being downloaded and installed on modified phone 50 or 46.

Modified phone 50 or 46 wirelessly communicates only via security pack 70 or 120 respectively. Once wirelessly connected to the assigned cell carrier via MODEM 24a or 24 respectively, the only data access available for that phone is data with encryption between the private cloud 99 and the phone. No other 3G/4G services available (normal voice calls, SMS etc.), The black core prevent access to any other networks.

To enhance security Wi-Fi capabilities may be removed from systems 200 and/or 300. Optionally, systems 200 and/or 300 may simulate normal phone functionality to make a call to a non-secure number. In this case, when calling a secured number, system 200 and/o 300 will encrypt the call, while when calling other numbers it will be decrypted and linked (bridged) to the unsecured number. Optionally, additionally and/or alternatively, a call to a non-secure number is routed encrypted to private cloud 99, which interprets and, and optionally filters and monitor it it and routes it via cryptographic module appliance or server 89 and then (decrypted) via Mobile carrier Serving Gateway (SGW) 91 to the non-secure number. Similarly, access to internet 96 may be achieved.

As used herein, the term "computer", processor or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A cellular phone security system comprising:
   a modified cellular Smartphone; and
   a security pack, the security pack comprises:
   an envelope or jacket shaped enclosure with flexible lips configured to mechanically connect and hold the cellular Smartphone;
   a Cryptographic module; and
   a mating data connector configured to be connected to a docking connector of the modified cellular Smartphone,
   wherein the modified cellular Smartphone is modified to route all cellular outgoing data and all cellular incoming data through the docking connector and the mating data connector, such that cellular data exchange between said modified cellular Smartphone and the cellular network is processed by the security pack, and
   wherein the cellular outgoing data is encrypted by the Cryptographic module and the cellular incoming data is decrypted by the Cryptographic module,
   wherein said security pack is constructed in a form of a protective case having a cavity into which said modified cellular Smartphone is inserted such that the touchscreen of said modified cellular Smartphone is exposed,
   wherein said security pack further comprises two emergency erase switches, located within said cavity into which said modified cellular Smartphone is inserted and exposed only when said modified cellular Smartphone is not inserted in said cavity, and
   wherein simultaneously pressing said two emergency erase switches for predefined time interval initiates an erase sequence causing erasure of cryptographic keys, thus disabling the functionality of said security pack.

2. The cellular phone security system of claim 1, wherein:
   said modified cellular Smartphone is modified to disable the native cellular transceiver within said modified cellular Smartphone,
   said security pack further comprises an external cellular transceiver, and
   said Cryptographic module is connected between said modified cellular Smartphone and said external cellular transceiver.

3. The cellular phone security system of claim 1, wherein:
   said modified cellular Smartphone is modified by installing modified high-security Operating System software image to improve security, and
   said high-security Operating System software image is configured to route all cellular outgoing data and all cellular incoming data via said Cryptographic module such that cellular data exchange between said modified cellular Smartphone and the cellular network is encrypted by said Cryptographic module.

4. The cellular phone security system of claim 1, wherein said security pack further comprises a hole located in front of the back camera of said modified cellular Smartphone.

5. The cellular phone security system of claim 1, wherein said security pack further comprises:
   a rigid enclosure, said rigid enclosure enclosing at least said Cryptographic module;
   a tamper detector, for detecting physical tampering or attempt to open said rigid enclosure; and
   at least one battery for powering said tamper detector when said security pack is not powered,
   wherein triggering said tamper detector cause irreversible disablement of the functionality of said security pack.

6. The cellular phone security system of claim 1, wherein said security pack further comprises auxiliary device connector, said auxiliary device connector is for at least one of:
a) loading software, data or cryptographic keys into said security pack;
b) commanding or reprogramming said modified cellular Smartphone;
c) charge at least one battery within said security pack or within said modified cellular Smartphone; and
d) connecting axillary computing unit for exchanging data with said modified cellular Smartphone.

7. The cellular phone security system of claim 2, wherein said security pack further comprises at least one additional wireless unit, said at least one additional wireless unit is selected from the group consisting of:
a) wireless LAN such as Wi-Fi;
b) Bluetooth;
c) Near-Field Communication (NFC) reader; and
d) GPS receiver.

8. The cellular phone security system of claim 2, wherein said Cryptographic module further comprises:
a high-security side, connected to a high-security bus, for exchanging sensitive data only; and
a low-security side, connected to a low-security bus, for exchanging only encrypted data, said encrypted data is one of:
a) data to be decrypted by said Cryptographic module; or
b) data encrypted by said Cryptographic module.

9. The cellular phone security system of claim 8, wherein:
said high-security bus is coupled to said modified cellular Smartphone; and
said low-security bus is coupled to said external cellular transceiver.

10. The cellular phone security system of claim 9, wherein:
said security pack further comprises at least one additional wireless unit and said low-security bus is coupled to said additional wireless unit.

11. The cellular phone security system of claim 1, wherein said cellular network is coupled to at least one server or crypto device for encrypting high-security data coming from classified organization high-security network and sending the encrypted data stream over said cellular network to said one or more said modified cellular phones.

12. The cellular phone security system of claim 1, wherein said cellular network is coupled to at least one server or crypto device for decrypting low-security encrypted data stream sent over said cellular network from said one or more modified cellular phones and sending the decrypted data stream to said classified organization high-security network.

13. A security pack for securing a modified cellular Smartphone comprising:
an envelope or jacket shaped enclosure with flexible lips configured to mechanically connect and hold the cellular Smartphone;
a Cryptographic module; and
a mating data connector configured to be connected to a docking connector of the modified cellular Smartphone, and
wherein said security pack routes all cellular outgoing data and all cellular incoming data through the docking connector and the mating data connector, such that cellular data exchange between said modified cellular Smartphone and the cellular network is processed by the security pack, and
wherein the cellular outgoing data is encrypted by the Cryptographic module and the cellular incoming data is decrypted by the Cryptographic module,
wherein said security pack is constructed in a form of a protective case having a cavity into which said modified cellular Smartphone is inserted such that the touchscreen of said modified cellular Smartphone is exposed,
wherein said security pack further comprises two emergency erase switches, located within said cavity into which said modified cellular Smartphone is inserted and exposed only when said modified cellular Smartphone is not inserted in said cavity, and
wherein simultaneously pressing said two emergency erase switches for predefined time interval initiates an erase sequence causing erasure of cryptographic keys, thus disabling the functionality of said security pack.

14. The cellular phone security system of claim 13, wherein said security pack further comprises an external cellular transceiver, and wherein said Cryptographic module is connected between said modified cellular Smartphone and said external cellular transceiver.

15. A method for securing a cellular phone comprising:
modifying a cellular Smartphone;
coupling to said cellular Smartphone a security pack, wherein said security pack comprises an envelope or jacket shaped enclosure with flexible lips configured to mechanically connect and hold the cellular Smartphone; a Cryptographic module; and a mating data connector configured to be connected to a docking connector of the said modified cellular Smartphone,
wherein said modified cellular phone is modified to route all cellular outgoing data and all cellular incoming data through the docking connector and the mating data connector, such that cellular data exchange between said modified cellular Smartphone and the cellular network is processed by said security pack, and
wherein the cellular outgoing data is encrypted by the Cryptographic module and the cellular incoming data is decrypted by the Cryptographic module,
wherein said security pack is constructed in a form of a protective case having a cavity into which said modified cellular Smartphone is inserted such that the touchscreen of said modified cellular Smartphone is exposed,
wherein said security pack further comprises two emergency erase switches, located within said cavity into which said modified cellular Smartphone is inserted and exposed only when said modified cellular Smartphone is not inserted in said cavity, and
wherein simultaneously pressing said two emergency erase switches for predefined time interval initiates an erase sequence causing erasure of cryptographic keys, thus disabling the functionality of said security pack.

16. The method for securing a cellular phone of claim 15, wherein:
said modifying said cellular Smartphone comprises disabling the native cellular transceiver within said modified cellular Smartphone,
said security pack further comprises an external cellular transceiver, and
said Cryptographic module is connected between said modified cellular Smartphone and said external cellular transceiver.

17. The method for securing a cellular phone of claim 15, wherein:
said modifying of said cellular Smartphone comprises installing modified high-security Operating System software image to improve security, and said high-security Operating System software image is configured to route all cellular outgoing data and all cellular incoming data via said Cryptographic module such that cellular data exchange between said modified cellular Smartphone and the cellular network is encrypted by said Cryptographic module.

* * * * *